3,355,456
PRODUCTION OF MONOHALOPYRIDINOLS
Arthur R. Sexton, Midland, Mich., assignor to The Dow Chemical Company, Midland, Mich., a corporation of Delaware
No Drawing. Filed May 6, 1965, Ser. No. 453,839
4 Claims. (Cl. 260—297)

ABSTRACT OF THE DISCLOSURE

Corresponding monohalopyridinols are produced by reacting 2,4 - dihalopyridines and 2,6 - dihalopyridines with alkali metal hydroxide in the presence of a tertiary lower alkanol solvent which may contain up to half its weight of water. The water azeotrope of the alkanol is a preferred solvent. The reaction is essentially restricted to the replacement of one of the two halogen substituents on the pyridine ring.

---

This invention concerns an improved process for making monohalogenated 2- and 4-pyridinols by the hydrolysis of the corresponding dihalopyridines.

Individual halopyridinols have been prepared in the past by indirect and complicated methods such as the diazotization of an aminohalopyridine, the decarboxylation of a halogenated pyridine acid, or the hydrolysis of an alkoxyhalopyridine. Halogenation of a pyridinol normaly yields mixtures of isomers and both mono- and dihalo compounds. Although some monohalopyridines can be hydrolyzed successfully by conventional methods to make the corresponding pyridinol, these methods give relatively poor yields of halogenated pyridinols when applied to the selective hydrolysis of one halogen atom in a dihalopyridine molecule. When it is attempted to hydrolyze a dihalopyridine with the water solution of a base, for example, the insolubility of the starting material is a hindrance to the reaction and the relatively soluble monohydrolysis product, once formed, is prone to react further, giving undesirable dihydroxy compounds and their decomposition products. When the base is dissolved in a conventional mutual solvent such as methanol, ethanol, or aqueous solutions thereof to facilitate the reaction, the reaction product is largely an alkyl ether rather than the desired pyridinol.

It has now been found that a monohalopyridinol is obtained in high yield by the hydrolysis of a corresponding dihalopyridine having one of the formulas

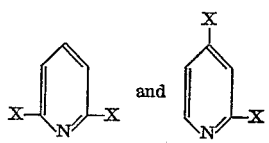

wherein X is chlorine or bromine, when the dihalopyridine is reacted with 1.5–2.5 moles of an alkali metal hydroxide in the presence of a solvent consisting essentially of a tertiary lower alkanol and 0–50% of water based on the weight of alkanol. This process is particularly adapted to the preparation of monochloropyridinols. Surprisingly, although both halogen atoms in the dihalopyridine starting material are in reactive positions, i.e., alpha or gamma to the nitrogen atom in the pyridine ring, there is substantial hydrolysis of only one halogen atom per molecule and little or no dihydroxypyridine is found in the reaction product.

Tertiary butyl alcohol and tertiary amyl alcohol or mixtures thereof are suitable alkanols. Tertiary butyl alcohol is a preferred alkanol component and best results are obtained by using a solvent containing 75–95% by weight of this alkanol, the remainder being water. It is most convenient to employ aqueous tertiary butyl alcohol substantially of the composition of the azeotropic mixture, this mixture containing about 11.7% by weight of water and boiling at about 80° C. In this way, not only are optimum results obtained in the reaction, but also the solvent is easily recoverable in its original composition from the reaction mixture by a simple distillation from which is can be recycled directly to the process. The process can be run in this way as a continuous process, for example, using a coil or other type of elongated reaction zone wherein the solvent is continuously recycled from distillation of the effluent product to the make-up of the feed mixture. The water azeotrope of tertiary amyl alcohol (27.5% water) can be used similarly but is less desirable because of its higher cost and poorer solvent power.

The hydrolysis can be carried out successfully at any temperature within the range 90–250° C. Best yields are obtained in convenient reaction times when the reaction temperature is about 125–175° C. Reaction times of 0.5–10 hours are typical at this preferred temperature range.

Because of the boiling point of the solvent, this liquid phase process is usually run under superatmospheric pressure. When the reaction temperature makes a pressure reaction necessary, the autogenous pressure of the system is sufficient.

The volume of solvent employed is not a critical feature of the process so long as enough is used to dissolve at least a significant portion of both the base and the polyhalopyridine. About 0.2–3 liters of solvent per gram mole of dihalopyridine is preferred.

Any alkali metal hydroxide can be used in the hydrolysis reaction, for example, lithium hydroxide, sodium hydroxide, potassium hydroxide, and cesium hydroxide or mixtures thereof give similar results. The reaction conditions, particularly the proportion of solvent, are best adjusted within the above-defined limits according to the solubility of the particular base used. Sodium hydroxide is ordinarily preferred for its lower cost. Best results are obtained when about 1.9–2.1 moles of alkali metal hydroxide are used per mole of dihalopyridine.

The halopyridinol product is present in the reaction mixture as its alkali metal salt. The free halopyridinol is easily recoverable from this mixture by conventional methods such as acidification followed by extraction, distillation, or recrystallization. Example 1 describes a suitable procedure.

Example 1

A jacketed nickel reactor equipped with a stirrer was charged with 2400 g. of the water azeotrope of tertiary butyl alcohol (11.7% by wt. H₂O), 444 g. of 2,6-dichloropyridine, and 240 g. of NaOH. The reactor was closed and heated to 150–155° C. while the reaction mixture was stirred and the temperature was held at this level for four hours. The mixture was then cooled to 70° C. and 500 g. of water was added to dissolve the sodium chloride which had formed. The reactor was drained, washed with water, and the combined reaction mixture and wash water was distilled to remove the tertiary butyl alcohol as its water azeotrope. The distillation residue consisted of an oil layer which was essentially unreacted 2,6-dichloropyridine and an aqueous layer. The layers were separated and the aqueous layer was acidified at 50° C. with hydrochloric acid, whereupon 6-chloro-2-pyridinol precipitated as a fine white solid. The solid product was filtered off at 10° C., washed with cold water, and dried to a constant weight of 301 g. of white crystals assaying 96% 6-chloro-2-pyridinol. The recovered 2,6-dichloropyridine amounted to 82.0 g. On this basis, 82% of the starting 2,6-dichloropyridine had been converted or hydrolyzed to produce a yield of 91% of the theoretical quantity of 6-chloro-2-pyridinol.

*Examples 2–7*

Using the same molar ratio of sodium hydroxide to 2,6-dichloropyridine and substantially the same relative weights of solvent and reactants, the procedure of Example 1 was repeated using different reaction times and various solvents. In some runs, a stainless steel reactor was used in place of the nickel reactor. The difference in metals was found not to affect the results. All runs were made at 150–155° C. except as noted. The results are tabulated below, those of Example 1 being included for comparison.

| Example | Solvent | Time, hrs. | Percent Conv. | Percent Yield |
|---|---|---|---|---|
| 1 | t-Butyl alcohol-water azeotrope. | 4 | 82 | 91 |
| 2 | ....do.... | 2 | 76 | 99 |
| 3 | 95% t-butyl alcohol, 5% water. | 2 | 97 | 84 |
| 4 | 80% t-butyl alcohol, 20% water. | 2 | 67 | 90 |
| 5 | 72.5% t-amyl alcohol, 27.5% water (azeotrope). | 2 | 29 | 92 |
| 6 | Isopropyl alcohol-water azeotrope. | [1] 4 | 95 | [2] 41 |
| 7 | Water only | 2 | 73 | [3] 41 |

[1] 130–135° C.
[2] 6-chloro-2-isopropoxypyridine was obtained in 49% yield.
[3] Remainder of hydrolyzed product was dihydroxypyridine and decomposition products.

When 2,6-dibromopyridine is used as the dihalopyridine reactant in place of 2,6-dichloropyridine in the general procedure as outlined above, 6-bromo-2-pyridinol is produced in yields similar to those shown in Examples 1–5.

This improved process gives similar results when it is applied to the hydrolysis of 2,4-dihalopyridines. The product of this hydrolysis is the 2-halo-4-pyridinol containing some 4-halo-2-pyridinol. For example, when 2,4-dichloropyridine is hydrolyzed according to the general procedure described in Examples 1–5, the pyridinol product is largely 2-chloro-4-pyridinol with a minor proportion of 4-chloro-2-pyridinol. These compounds can be separated if desired by conventional methods such as fractional crystallization, distillation, or extraction.

I claim:

1. A process for making a monohalopyridinol which comprises reacting by contacting a dihalopyridine having a formula selected from the group consisting of

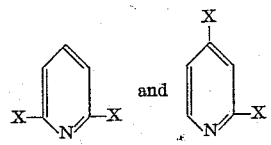

wherein X is halogen of atomic number 17–35 with 1.5–2.5 moles of alkali metal hydroxide at 90–250° C., said dihalopyridine and alkali metal hydroxide being at least partially dissolved in a solvent consisting of a tertiary alkanol of 4–5 carbon atoms and 0–50% of water based on the weight of alkanol, and recovering a monohalopyridinol from the reaction mixture thereby obtained.

2. The process of claim 1 wherein the dihalopyridine has the formula

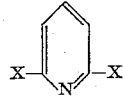

3. A process for making 6-chloro-2-pyridinol which comprises reacting by contacting 2,6-dichloropyridine with 1.9–2.1 moles of sodium hydroxide at 125–175° C., said 2,6-dichloropyridine and said sodium hydroxide being at least partially dissolved in a solvent consisting essentially of 95–75% tertiary butyl alcohol and 5–25% by weight of water, and recovering 6-chloro-2-pyridinol from the reaction mixture thereby obtained.

4. A continuous process for making 6-chloro-2-pyridinol which comprises forming a mixture of 2,6-dichloropyridine with 1.9–2.1 moles of sodium hydroxide and sufficient solvent to dissolve at least a portion of said dichloropyridine and said hydroxide, said solvent being essentially the water azeotrope of tertiary butyl alcohol, reacting said mixture by heating it at 125–175° C. in a reaction zone, continuously withdrawing a portion of the reacted mixture from said zone, recovering at least a portion of said solvent by distilling the withdrawn mixture, and recycling the recovered solvent to the process.

References Cited

Klingsberg, Pyridine and Derivatives, Part 3, InterScience (1962), pp. 572–575.

WALTER A. MODANCE, *Primary Examiner.*

A. J. ROTMAN, *Assistant Examiner.*